United States Patent
Mitrovic et al.

(10) Patent No.: US 10,577,118 B2
(45) Date of Patent: Mar. 3, 2020

(54) POWER PLANT MANAGEMENT SYSTEM FOR DUAL ENGINE HELICOPTER IN SINGLE ENGINE OPERATION MODE

(71) Applicant: PRATT & WHITNEY CANADA CORP., Longueuil (CA)

(72) Inventors: Lazar Mitrovic, Longueuil (CA); Eric Durocher, Vercheres (CA); Keith Morgan, Westmount (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 262 days.

(21) Appl. No.: 15/412,451

(22) Filed: Jan. 23, 2017

(65) Prior Publication Data

US 2017/0327241 A1     Nov. 16, 2017

Related U.S. Application Data

(60) Provisional application No. 62/328,200, filed on Apr. 27, 2016.

(51) Int. Cl.
    *F02C 6/02*                 (2006.01)
    *B64D 35/08*              (2006.01)
    (Continued)

(52) U.S. Cl.
CPC .............. *B64D 35/08* (2013.01); *B64C 27/12* (2013.01); *B64D 27/10* (2013.01); *B64D 31/06* (2013.01);
(Continued)

(58) Field of Classification Search
CPC .... Y10T 477/753; B64D 35/08; B64D 31/06; B64D 27/10; B64C 27/12; F02C 7/32;
(Continued)

(56) References Cited

U.S. PATENT DOCUMENTS 2,961,052 A    11/1960   Smith et al.
3,748,927 A    7/1973   Hertzog et al.
(Continued)

FOREIGN PATENT DOCUMENTS

WO    WO2009111705    9/2009
WO    2015145045    10/2015
WO    WO2016168340    10/2016

OTHER PUBLICATIONS

European Search Report issued in counterpart EP application No. 17168309.7 dated Sep. 29, 2017.

*Primary Examiner* — Roger L Pang
(74) *Attorney, Agent, or Firm* — Norton Rose Fulbright Canada L.L.P.

(57) ABSTRACT

A method of operating a twin engine helicopter power plant, the power plant comprising: two turboshaft engines each having an engine shaft with a turbine at a distal end and a one-way clutch at a proximal end; a gear box having an input driven by the one way clutch of each engine and an output driving a helicopter rotor; a bypass clutch disposed between the proximal end of each engine shaft and the input of the gear box; and power plant management system controls for activating the bypass clutch; the method comprising: detecting when a rotary speed of an associated engine shaft is less than a rotary speed of the gear box input; activating the bypass clutch to drive the associated engine shaft using the rotation of the gear box input; and starting an associated engine by injecting fuel when the bypass clutch is activated.

17 Claims, 4 Drawing Sheets

(51) Int. Cl.
  *F02C 7/32* (2006.01)
  *F02C 7/26* (2006.01)
  *B64C 27/12* (2006.01)
  *B64D 27/10* (2006.01)
  *B64D 31/06* (2006.01)
  *F02C 7/22* (2006.01)
  *F02C 7/262* (2006.01)
  *F02C 7/275* (2006.01)
  *F02C 7/36* (2006.01)
  *F16D 48/02* (2006.01)

(52) U.S. Cl.
  CPC .............. *F02C 6/02* (2013.01); *F02C 7/22* (2013.01); *F02C 7/26* (2013.01); *F02C 7/262* (2013.01); *F02C 7/275* (2013.01); *F02C 7/32* (2013.01); *F02C 7/36* (2013.01); *F16D 48/02* (2013.01); *F05D 2220/323* (2013.01); *F05D 2220/329* (2013.01); *F05D 2260/404* (2013.01); *F05D 2260/4023* (2013.01); *F05D 2260/85* (2013.01); *F05D 2260/902* (2013.01); *F05D 2260/903* (2013.01); *Y02T 50/671* (2013.01); *Y10T 477/753* (2015.01)

(58) Field of Classification Search
  CPC .... F02C 6/02; F02C 7/275; F02C 7/36; F05D 2260/85; F05D 2220/323; F05D 2260/4023; F05D 2220/329
  USPC .............................................. 74/665 B, 665 E
  See application file for complete search history.

(56) References Cited

U.S. PATENT DOCUMENTS

| | | | | |
|---|---|---|---|---|
| 4,651,521 | A * | 3/1987 | Ossi | F01D 15/12 |
| | | | | 60/226.3 |
| 4,783,023 | A * | 11/1988 | Jupe | B64C 27/12 |
| | | | | 244/17.19 |
| 4,875,643 | A | 10/1989 | Gietzen et al. | |
| 7,628,355 | B2 | 12/2009 | Palcic et al. | |
| 9,353,642 | B2 * | 5/2016 | Certain | B64D 35/08 |
| 9,387,934 | B2 | 7/2016 | Gomez | |
| 9,964,184 | B2 * | 5/2018 | Modrzejewski | F16H 3/58 |
| 2015/0191250 | A1 | 7/2015 | DeVita et al. | |
| 2016/0329777 | A1 * | 11/2016 | Mariotto | H02K 7/006 |

* cited by examiner

Fig_1 (PRIOR ART)

POWER PLANT MANAGEMENT SYSTEM FOR DUAL ENGINE HELICOPTER IN SINGLE ENGINE OPERATION MODE

CROSS-REFERENCE TO RELATED APPLICATIONS

This application claims priority from U.S. provisional patent application No. 62/328,200, filed Apr. 27, 2016, the entire contents of which are incorporated by reference herein.

TECHNICAL FIELD

The invention relates to operating aircraft engines and, more particularly, to a method of operating a twin engine helicopter power plant.

BACKGROUND OF THE ART

Fuel consumption can be reduced by shutting down one of the twin engines during portions of the mission or flight when one engine provides sufficient power.

During take-off and landing, both of the twin engines may be utilized for safety and to ensure adequate power. While in flight, a single engine may provide sufficient power and fuel savings can be achieved by shutting down one engine. One highly loaded engine consumes less fuel than two lightly loaded engines, thereby resulting in net fuel savings.

Rapid reactivation of the dormant engine may be required if the other engine fails, or if additional power is required in flight. An independent rapid starting system is desirable to safely enable single engine operation.

SUMMARY

Provided is a method of operating a twin engine helicopter power plant, the power plant comprising: two turboshaft engines each having an engine shaft with a turbine at a distal end and a one-way clutch at a proximal end; a gear box having an input driven by the one way clutch of each engine and an output driving a helicopter rotor; a bypass clutch disposed between the proximal end of each engine shaft and the input of the gear box; and power plant management system controls for activating the bypass clutch; the method comprising: detecting when a rotary speed of an associated engine shaft is less than a rotary speed of the gear box input; activating the bypass clutch to drive the associated engine shaft using the rotation of the gear box input; and starting an associated engine by injecting fuel when the bypass clutch is activated.

Provided is a helicopter power plant suitable for single engine operation, the plant comprising: two turboshaft engines each having an engine shaft with a turbine at a distal end and a one-way clutch at a proximal end; a gear box having an input driven by the one way clutch of each engine and an output driving a helicopter rotor; a bypass clutch disposed between the proximal end of at least one of the engine shafts and the input of the gear box; and power plant controls for activating the bypass clutch when a rotary speed of an associated engine shaft is less than a rotary speed of the gear box input.

Provided is a helicopter comprising: two turboshaft engines each having an engine shaft with a turbine at a distal end and a one-way clutch at a proximal end; a gear box having an input driven by the one way clutch of each engine and an output driving a helicopter rotor; a bypass clutch disposed between the proximal end of each engine shaft and the input of the gear box; and power plant controls for activating the bypass clutch when a rotary speed of an associated engine shaft is less than a rotary speed of the gear box input.

DESCRIPTION OF THE DRAWINGS

In order that the invention may be readily understood, embodiments are illustrated by way of example in the accompanying drawings.

Further details and advantages will be apparent from the detailed description included below.

DETAILED DESCRIPTION OF PREFERRED EMBODIMENTS

Figure 1:
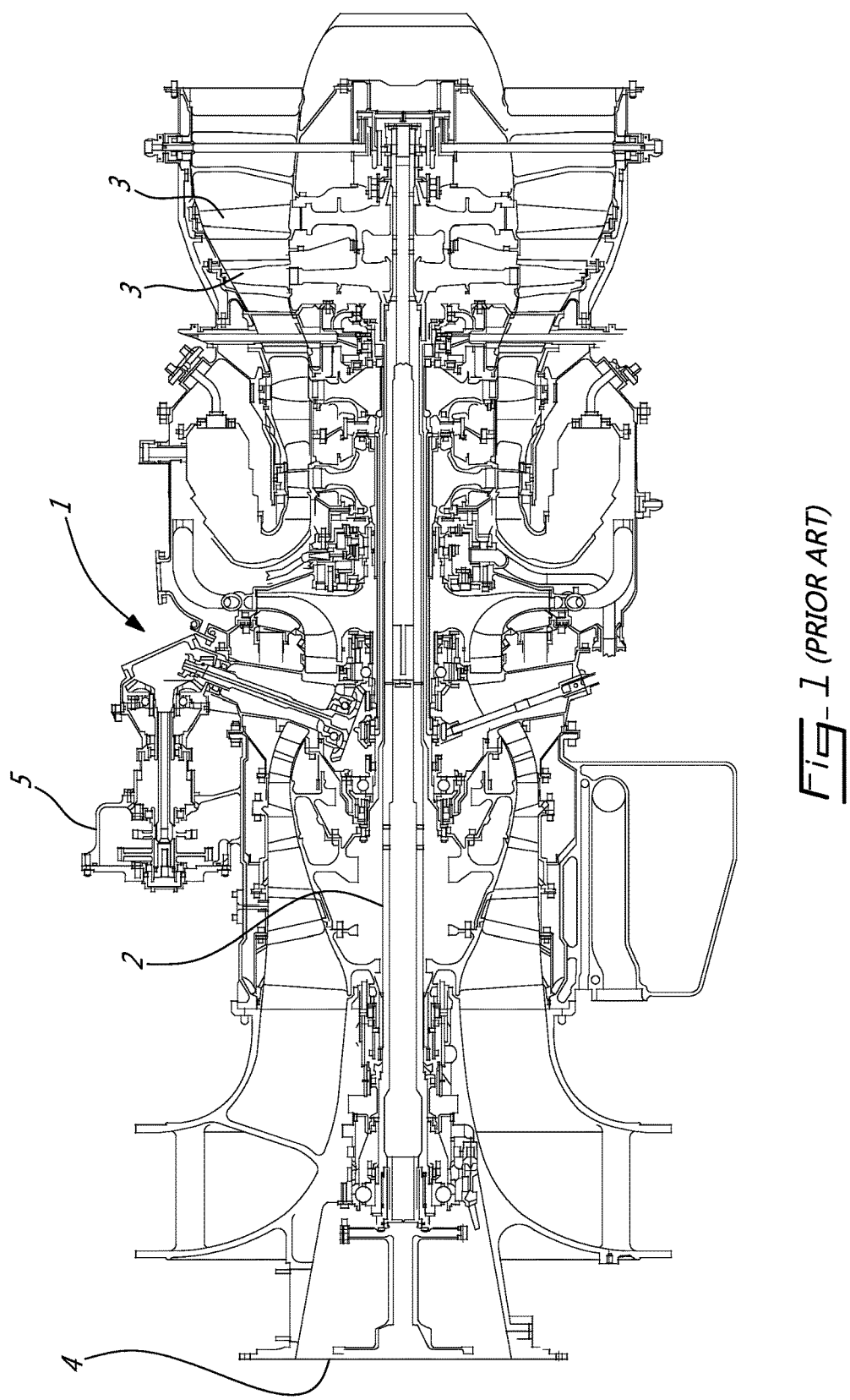
FIG. 1 is an axial cross-sectional view through a single turbo-shaft engine.

FIG. 1 shows a single turboshaft engine 1 having a LPC spool (low pressure compressor spool) engine shaft 2 with a LP turbine 3 at a distal end and a power takeoff flange 4 at a distal end. An auxiliary gear box 5 is connected with a starter motor (not shown) to drive the HPC spool (high pressure compressor spool) during engine startup.

Figure 2:
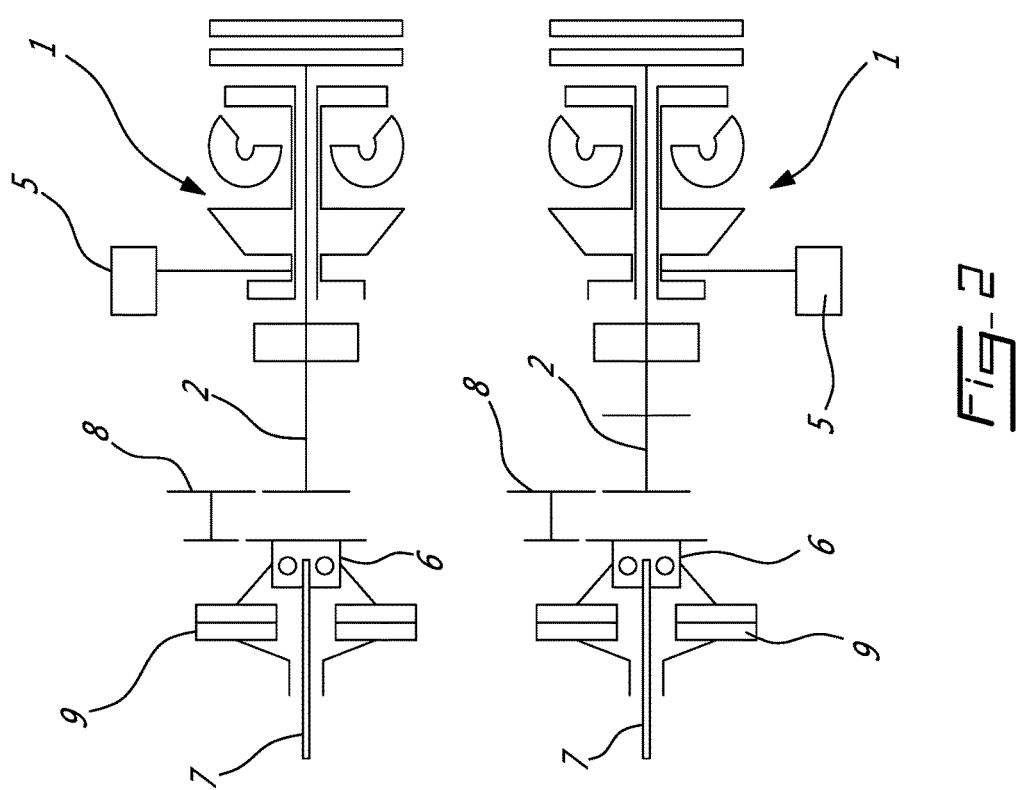
FIG. 2 is a schematic diagram of a twin engine powerplant for a helicopter where two turboshaft engines each have an associated one-way sprag clutch within an engine gearbox that drives a helicopter main gearbox and a bypass clutch.

FIG. 2 shows an arrangement of a twin engine power plant configured to drive a common gearbox (not shown) connecting both engines 1. Each engine 1 has a one-way sprag clutch 6 on the engine power takeoff shaft 2 to permit free-wheeling during autorotation of the helicopter rotor and main shaft 7. To start each engine, the AGB (auxiliary gearbox 5) is connected to an electric starter motor (Starter) which is powered by the Battery for normal starting procedures and by a rapid discharge Capacitor for fast start procedures or emergencies. The engine shaft 2 rotates and through reduction gears drives the lateral torque shaft 8. The torque shaft 8 then drives the one-way sprag clutch 6 to rotate the main shaft 7. During the engine operating condition, the sprag clutch 6 is engaged due to rotation of the engine shaft 2 and the bypass clutch 9 is disengaged.

Figure 3:
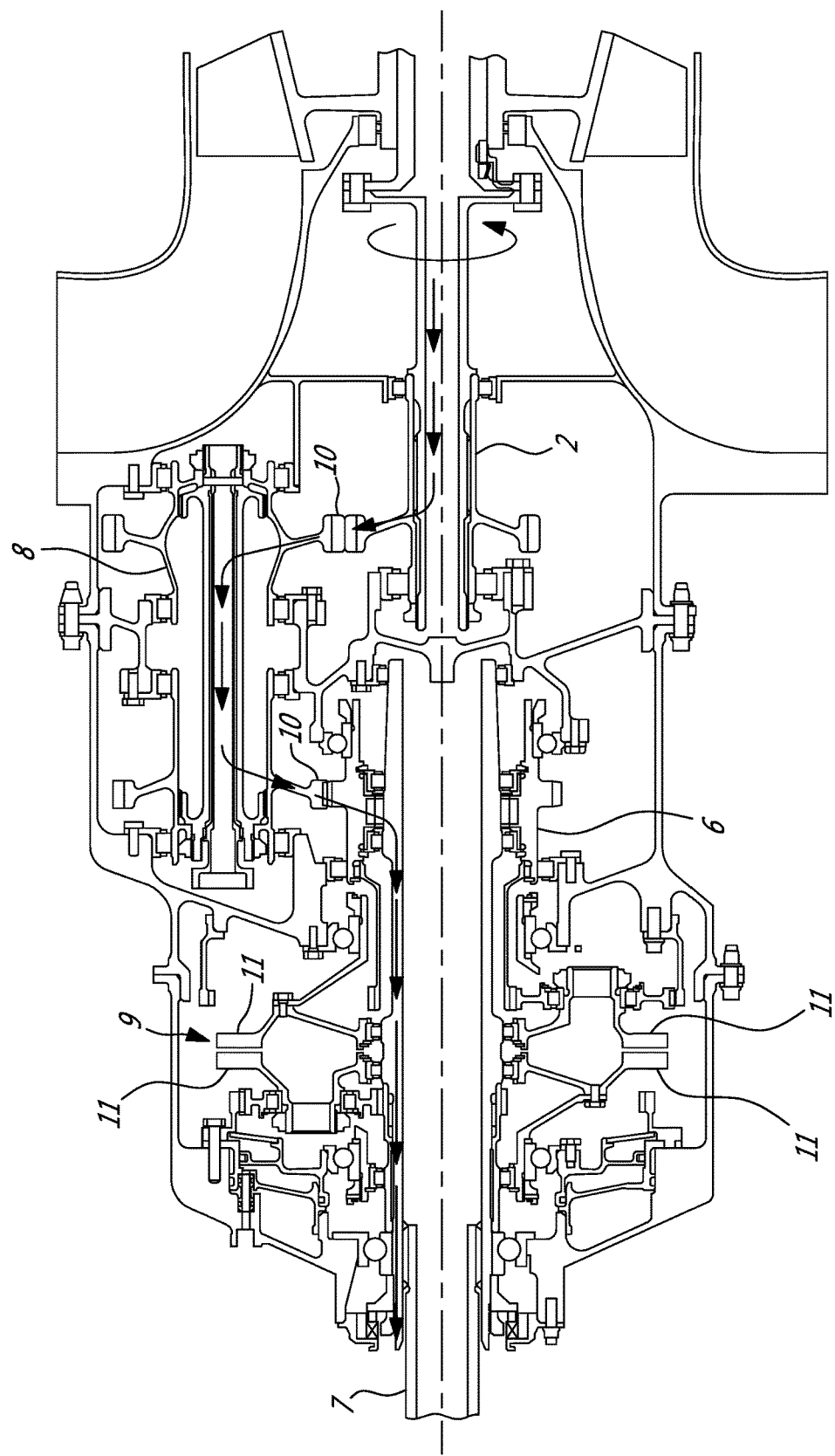
FIG. 3 is an axial cross-section through the shaft of the engine, a lateral torque shaft, the sprag clutch and the bypass clutch disengaged in an operating condition.

FIG. 3 shows an axial cross-section detail through the engine shaft 2, the lateral torque shaft 8, and the sprag clutch 6, all interconnected with reduction gears 10. The one-way sprag clutch 6 is engaged when rotated by the engine shaft 2 in the operating direction. The bypass clutch 9 is disengaged in the operating condition shown in FIG. 3 as indicated by the gap between the friction plates 11. Power is transmitted from the engine shaft 2 through the engaged sprag clutch 6 to the main shaft 7 along the gear path indicated in dashed arrow lines.

Described below is a power plant management system for operating a twin engine helicopter using a single engine to reduce fuel consumption and extend the range of the aircraft. As shown in FIG. 2, twin engine systems have an independent start system provided through the auxiliary gearbox 5 on each engine 1. The start system may be an electric motor or hydraulic or mechanical drives that reactivate the engine in an emergency or after a cruise mission when the engine was dormant. Start systems are heavy and any weight saving in an aircraft improves fuel consumption and flight performance.

Elimination of the independent start system for one of the twin engines is possible by providing a bypass clutch 9 that bypasses the freewheel or sprag clutch 6. The energy generated by the autorotation of the helicopter blades or by the other engine 1 is transmitted through the helicopter main gearbox (not shown) and main shaft 7 to the dormant engine 1. Normally the sprag clutch 6 would prevent transmission of torque to the dormant engine 1. However to restart the dormant engine 1, a bypass clutch 9 is activated and transmits torque to rotate the power transmission shaft 2 of the dormant engine 1, which bears the low pressure compressor. The power plant controls optimize the speed of the low pressure compressor and determines when to inject fuel to start the dormant engine without requiring an independent start system. Accordingly the power transmitted from the gearbox 7 through the activated bypass clutch 9 is used to restart the engine 1 rather than using an independent starter motor. Alternatively both sources of power can be used together, i.e. use of an independent starter motor and the gearbox power simultaneously.

Figure 4:
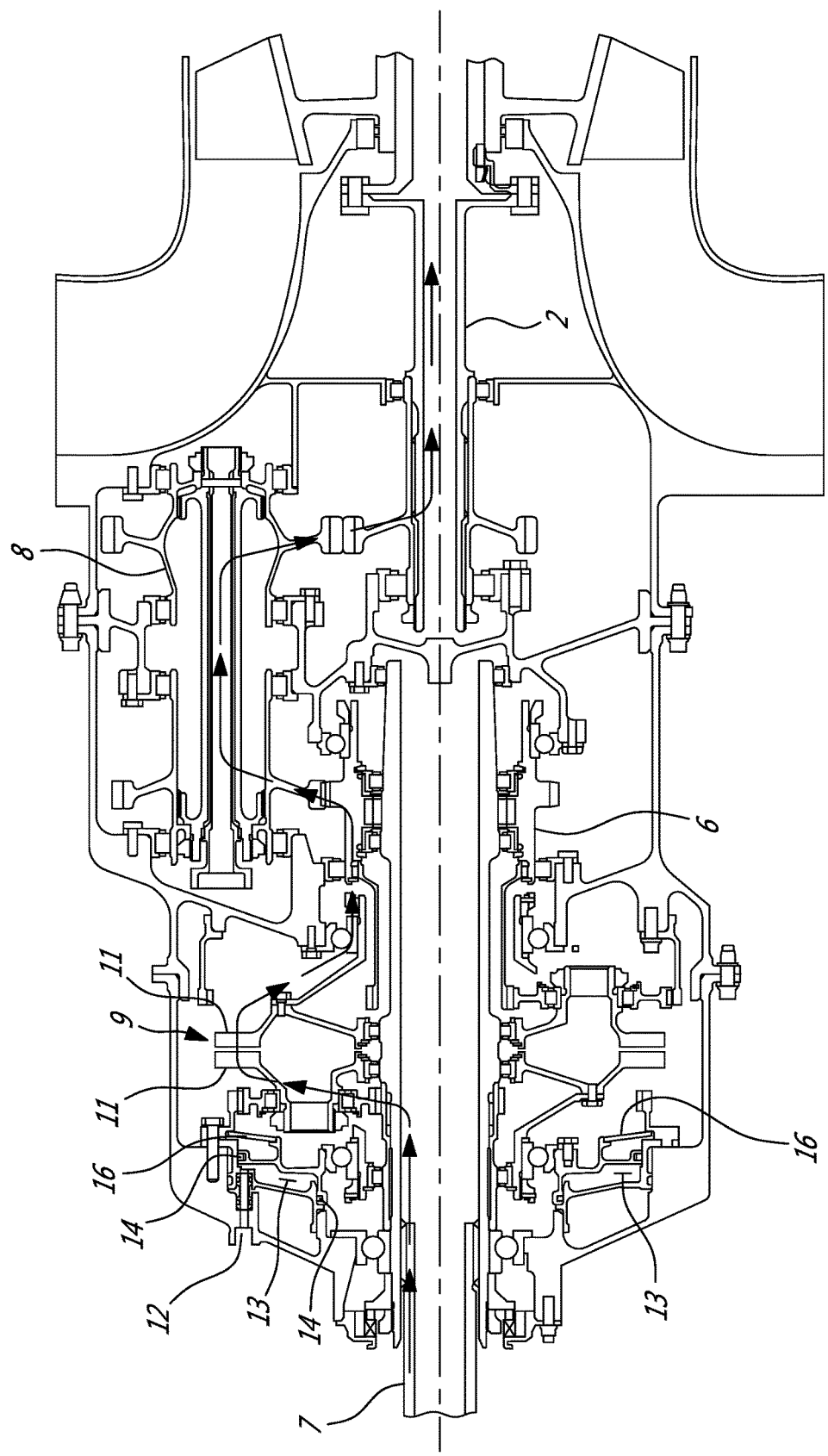
FIG. 4 is an axial cross-section like FIG. 3 with the bypass clutch in an engaged or engine start-up condition.

FIGS. 3 and 4 show an embodiment of a bypass clutch 9 arranged in parallel to bypass the one-way sprag clutch 6. The engine shaft 2 and torque shaft 8 normally rotate the output main shaft 7 through the sprag clutch 6 When the engine 1 is made dormant, during single engine operation or failure, the rotary speed of the engine shaft 2 reduces or stops. The sprag clutch 6 disengages because the output main shaft 7 rotates faster than the engine shaft 2. This occurs either because the main shaft 7 is rotated by autorotation of the helicopter blades or by the rotation of the other engine 1 of the twin pair through the helicopter main gearbox (not shown) that connects the two engines 1.

To start the dormant engine 1, the bypass clutch 9 is activated and the friction plates 11 engage as shown in FIG. 4. As indicated in dashed arrow lines in FIG. 4, the rotation of the main shaft 7 is transmitted through the bypass clutch 9 and torque shaft 8 to the engine shaft 2 to start the engine 1.

FIGS. 3-4 show an axial cross-sectional view of an embodiment of a bypass clutch 9 that is coaxially arranged axially spaced from the one-way sprag clutch 6. The bypass clutch 9 has annular friction surfaces 11 that are actuated axially to engage together as in FIG. 4 to transmit rotation between the main shaft 7 and engine shaft 2 while the sprag clutch 6 is disengaged.

Reactivation of the dormant engine 1 can be quickly achieved in less than six seconds for example by rapid actuation of the bypass clutch 9. The bypass clutch 9 is disengaged once the dormant engine 1 is started successfully. The bypass clutch may have annular friction plates 11 or conical friction surfaces (not shown), and other than use of a friction clutch, a hydraulic clutch or a magnetic clutch are other viable options. In the embodiment shown in FIG. 4, high pressure hydraulic fluid is injected through port 12 into chamber 13. Sliding annular seals 14 seal the chamber 13 and the pressurized hydraulic fluid exerts force on the clutch disc 15 to move the friction plate 11 from left to right. By releasing the pressure from the chamber 13, the clutch disc moves from right to left under the force of the Belleville spring washer 16 to the disengaged position shown in FIG. 3.

To start a dormant engine 1, the power plant controls activate the bypass clutch 9 with hydraulic fluid pressure. The LPC spool (low pressure compressor) is rotated up to a predetermined speed. Then the HPC spool (high pressure compressor) is rotated up to a predetermined speed. Fuel is then injected and the combustor is ignited. Then the bypass clutch 9 is disengaged once the engine 1 is started.

Although the above description relates to a specific preferred embodiment as presently contemplated by the inventors, it will be understood that the invention in its broad aspect includes mechanical and functional equivalents of the elements described herein.

We claim:

1. A helicopter power plant comprising:
   at least two turboshaft engines each having an engine shaft with a turbine at a distal end and a one-way clutch connected to a proximal end of the engine shaft;
   a gear box having an input driven by the one way clutch of each engine and an output driving a helicopter rotor;
   a bypass clutch disposed between the proximal end of at least one of the engine shafts and the input of the gear box, wherein the bypass clutch is co-axial with the one-way clutch; and
   power plant controls for activating the bypass clutch when a rotary speed of an associated engine shaft is less than a rotary speed of the gear box input.

2. The helicopter power plant according to claim 1 wherein the bypass clutch has one of: annular friction plates; and conical friction surfaces.

3. The helicopter power plant according to claim 1 wherein the bypass clutch is one of: a hydraulic clutch; and a magnetic clutch.

4. The helicopter power plant according to claim 1 wherein the bypass clutch is axially spaced from the one-way clutch.

5. The helicopter power plant according to claim 4 wherein the bypass clutch is one of: a friction clutch; a hydraulic clutch; and a magnetic clutch.

6. A helicopter comprising:
   two turboshaft engines each having an engine shaft with a turbine at a distal end and a one-way clutch connected to a proximal end of the engine shaft;
   a gear box having an input driven by the one way clutch of each engine and an output driving a helicopter rotor;
   a bypass clutch disposed between the proximal end of each engine shaft and the input of the gear box, wherein the bypass clutch is axially spaced from the one-way clutch; and
   power plant controls for activating the bypass clutch when a rotary speed of an associated engine shaft is less than a rotary speed of the gear box input.

7. The helicopter according to claim 6 wherein the bypass clutch is co-axial with the one-way clutch.

8. The helicopter according to claim 7 wherein the bypass clutch has one of: annular friction plates; and conical friction surfaces.

9. The helicopter according to claim 7 wherein the bypass clutch is one of: a hydraulic clutch; and a magnetic clutch.

10. The helicopter according to claim 6 wherein the bypass clutch is one of: a friction clutch; a hydraulic clutch; and a magnetic clutch.

11. A method of operating a twin engine helicopter power plant, the power plant comprising: two turboshaft engines each having an engine shaft with a turbine at a distal end and a one-way clutch connected to a proximal end of the engine shaft; a gear box having an input driven by the one way clutch of each engine and an output driving a helicopter rotor; a bypass clutch disposed between the proximal end of each engine shaft and the input of the gear box, the bypass clutch axially spaced from the one-way clutch; and power plant management system controls for activating the bypass clutch;

the method comprising:
detecting when a rotary speed of an associated engine shaft is less than a rotary speed of the gear box input;
activating the bypass clutch to drive the associated engine shaft using the rotation of the gear box input; and
starting an associated engine by injecting fuel when the bypass clutch is activated.

12. The method according to claim 11 wherein the associated engine includes a starter motor, the method comprising:
activating the starter motor and the bypass clutch simultaneously.

13. The method according to claim 11 wherein the twin engine helicopter power plant is operated in single engine operation wherein an associated engine is shut down during flight.

14. The method according to claim 11 wherein the associated engine and bypass clutch are driven by autorotation of the helicopter rotor.

15. The method according to claim 14 wherein the bypass clutch has one of: annular friction plates; and conical friction surfaces.

16. The method according to claim 14 wherein the bypass clutch is one of: a hydraulic clutch; and a magnetic clutch.

17. The helicopter power plant according to claim 11 wherein the bypass clutch is one of: a friction clutch; a hydraulic clutch; and a magnetic clutch.

* * * * *